May 26, 1964  E. M. SHIEPE  3,134,540
NOMOGRAPHIC COMPUTING DEVICE
Filed June 25, 1962  6 Sheets-Sheet 1

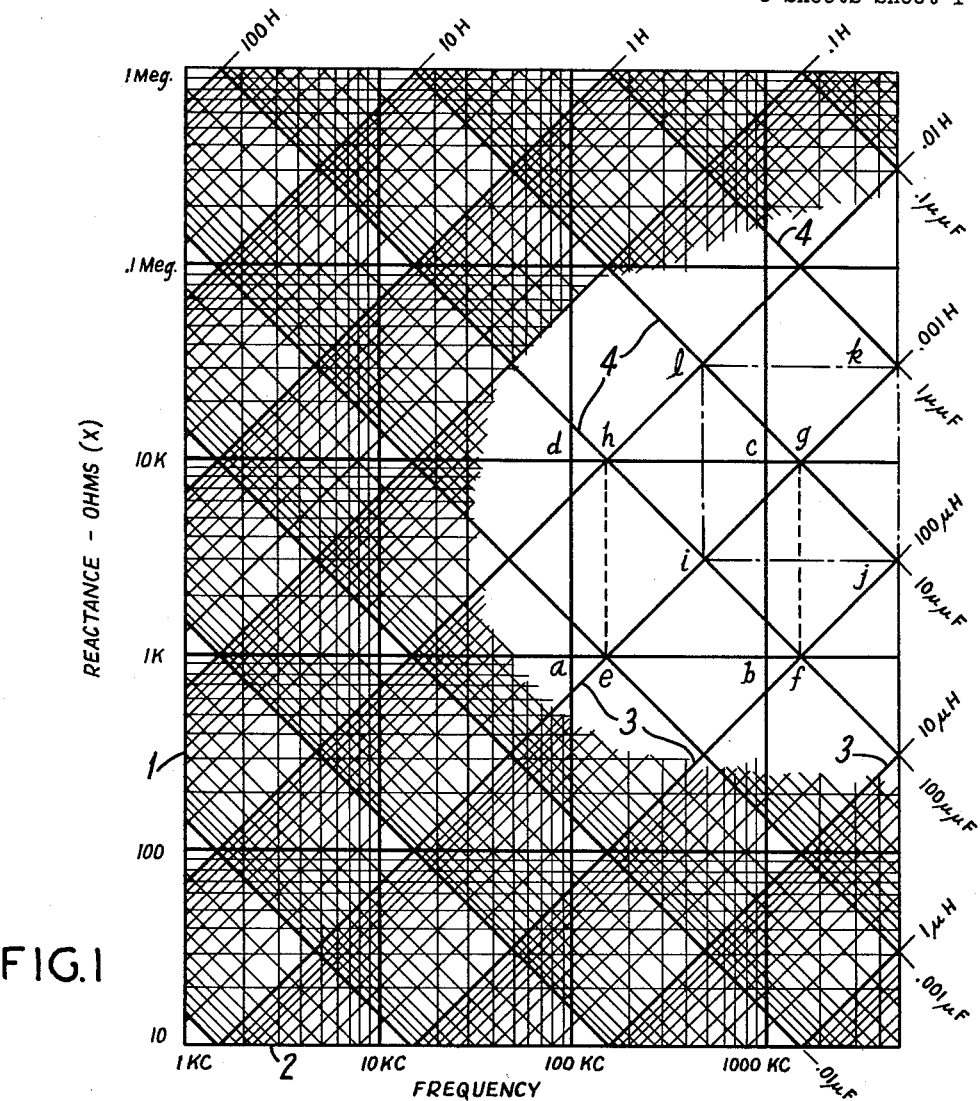

FIG.1

$abcd$ = Unit of area between successive decades of $F_r$ and $x$.
$efgh$ = Preferred unit of area between two decades of $L$ and $c$.
　　Diagonals $eg$ and $fh$ meet at $F_r = 5.03322\cdots$ the tuning
　　value for $L$ and $c$, very near the "5" calibration, and
　　$x = 3.163\cdots$ here. Only the $F_r$ scale is offset.
$ijkl$ = Alternate unit of area between two decades of $L$ and $c$.
　　Diagonals $ik$ and $jl$ meet at $F_r = 15.9165\cdots$. Both $F_r$ and $x$
　　scales are offset.

F = FARAD;　　　$F_r$ = FREQUENCY
L = INDUCTANCE　　$\mu$ = micro = $10^{-6}$
C = CAPACITANCE　　K = $10^3$
H = HENRY　　　Meg.= $10^6$ INVENTOR.
EDWARD M. SHIEPE
BY
E. J. Kalif
ATTORNEY.

May 26, 1964  E. M. SHIEPE  3,134,540
NOMOGRAPHIC COMPUTING DEVICE
Filed June 25, 1962  6 Sheets-Sheet 2

INVENTOR.
EDWARD M. SHIEPE
BY
ATTORNEY.

May 26, 1964     E. M. SHIEPE     3,134,540
NOMOGRAPHIC COMPUTING DEVICE
Filed June 25, 1962     6 Sheets-Sheet 3

INVENTOR.
EDWARD M. SHIEPE
ATTORNEY.

May 26, 1964  E. M. SHIEPE  3,134,540
NOMOGRAPHIC COMPUTING DEVICE
Filed June 25, 1962  6 Sheets-Sheet 4

INVENTOR.
EDWARD M. SHIEPE
BY
*E. J. Kalil*
ATTORNEY.

May 26, 1964     E. M. SHIEPE     3,134,540
NOMOGRAPHIC COMPUTING DEVICE
Filed June 25, 1962     6 Sheets-Sheet 6

INVENTOR.
*EDWARD M. SHIEPE*

BY

ATTORNEY.

United States Patent Office  3,134,540
Patented May 26, 1964

3,134,540
NOMOGRAPHIC COMPUTING DEVICE
Edward M. Shiepe, 111 86th St., Brooklyn, N.Y.
Filed June 25, 1962, Ser. No. 204,817
8 Claims. (Cl. 235—61)

This invention relates to an improved nomographic device and is especially useful in the design of electric circuits and is adapted, when the values of some variables are already known, to facilitate the determination of the values of other related variables.

Nomography affords a rapid means of making graphical calculations. A nomograph is advantageous in that it is generally simple in construction, can be used rapidly and is accurate. Generally speaking, a nomograph is made up of a plurality of mathematically correlated line coordinates, each representing a variable, the variables taken together being mathematically connected or correlated to an equation. By placing the reference lines in certain mathematically correlated positions relative to each other, it is possible, in the case of a multi-variable system, to determine speedily the value of one variable when the others are known.

In constructing a nomograph, it is necessary (1) to know the equation connecting or correlating the variables, or to know the equations, of the same type, relating, for example, two of the variables for each value of the third; (2) to know the scale, i.e. the range over which these change; (3) to identify the particular case with a type form; and (4) to determine the proper modulus or unit representation to be employed in laying off the desired scales.

With respect to the term "modulus," it is defined as the length of a graduation of a line coordinate which represents a change of one unit in the function of a variable. In mathematical systems involving values in which the scale may range from a very small quantity, e.g. a micro micro quantity, to a very large quantity, e.g. to a kilo or even a mega quantity and higher, the nomographic device or chart becomes large and is difficult to use, even when logarithmic scales are employed. The unit cell or logarithmic decade making up the chart becomes necessarily small because of the broad range of quantities involved and hence difficult to use and, because of this, errors are apt to occur in the placement of the decimal point in transposing data from the chart.

A case in point is the standard frequency-reactance chart (to be discussed in more detail later) which mathematically correlates values for the four variables frequency, reactance, inductance and capacitance as determined by the logarithmic interpretation of the following equations:

$$X_C = \frac{1}{2\pi f C}$$

$$X_L = 2\pi f L$$

In such a chart, the variables are represented by a plurality of mathematically correlated reference line coordinates based on cartesian coordinates comprising an ordinate for representing reactance, an abscissa for representing frequency, a first group of parallel reference lines within the area bounded by the ordinate and the abscissa for representing inductance but at an angle of 45° with the abscissa and a second group of parallel reference lines for representing capacitance at right angles to the first group of parallel lines but at an angle of 45° with the ordinate.

Because the moduli or units of the foregoing reference lines are preferably laid off logarithmically in order to express as broad a range as possible, the unit cell or logarithmic decade becomes necessarily small, and, therefore, difficult to read. It would be more desirable to use a large unit cell or decade but to do so would result in a large and unwieldy chart difficult to handle where three, four or more logarithmic decades are employed along a line coordinate.

An approach to the foregoing problem would be to use one very large unit cell or decade whose scale can be easily and rapidly changed to suit the particular problem at hand. However, in using a chart based on one unit cell, it is necessary to know nomographically the proper modulus or unit representation to be employed in laying off the desired scales and also to know the ranges, that is the magnitude of the range, over which the particular variables change.

I have now discovered a simple but accurately effective computing device based preferably on a unit cell, though not necessarily limited thereto, whereby the scales representing the variables are automatically determined to suit the problem at hand. Through my device, I provide a novel mechanism capable of revealing the range or scale for each of the line coordinates in such a way that when a scale of a particular line coordinate is varied, the others are simultaneously and correctly varied. For example, it is possible through my device to hold a scale for one coordinate constant while the others are varied to suit a particular solution for a problem.

It is thus an object of my invention to provide a computing mechanism in the form of a nomographic device capable of being employed over any desired scale range without changing the unit construction or modulus constituting the scale.

Another object of my invention is to provide a nomographic device comprising a first panel having associated on a surface thereof a plurality of mathematically correlated reference line coordinates and a second panel containing a plurality of groups of correlated moduli quantities such that by superimposing the first panel on the top of the second panel and manipulating one with respect to the other, preferably with the aid of indexing means or a parallel motion mechanism of the pantograph type, it is possible to determine accurately and simultaneously the scales of the line coordinates on the first panel in solving a particular problem.

A still further object of my invention is to provide a nomographic device for determining the values of variables of an electronic circuit and, in particular, in determining the values of the mathematically connected variables frequency, reactance, inductance and capacitance.

A further object is to provide as a preferred embodiment an improved nomographic device in which the unit cell employed in the standard frequency-reactance chart is modified with respect to the placement of the graduations thereon to render it easier to use.

These and other objects will more clearly appear when taken in conjunction with the drawing, wherein:

FIG. 1 depicts a portion of a standard logarithmic frequency reactance chart with a portion cut away showing the basis upon which a unit cell chart is developed;

Figure 2:
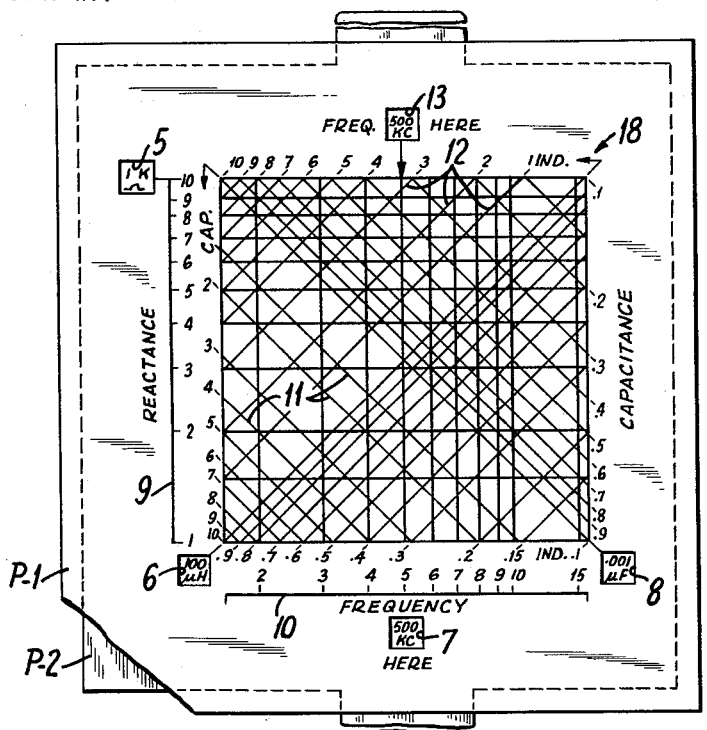
FIG. 2 is illustrative of one embodiment of my improved device comprising two panels, one superimposed on the other, which are manipulated relative to each other in carrying out the invention, the top panel hiding the lower panel from view except for the values appearing in the windows of the top panel.

In carrying my invention into practice, I have developed a novel nomographic device for use in calculating a multi-variable problem comprising a first panel superimposable upon a second panel. A plurality of mathematically correlated reference line coordinates are provided associated with a surface of said first panel in which each coordinate represents a variable. Indicia divide the line coordinates into moduli characteristic of the variable they represent. In addition, a plurality of windows are provided on said first panel each correlated to a particular reference line coordinate and adapted by cooperation with the second panel to indicate the range of the moduli along said particular line coordinate. A plurality of groups of mathematically correlated moduli quantities are provided on the second panel with each group correlated to a particular variable represented by its line coordinate on the first panel, each group of moduli quantities being cooperably related to a window on the first panel, the size of the related window being sufficient to reveal one of the quantities of said moduli group. To aid in using the device, index means are provided which may be either mechanical or visual, for lining up each of the windows of said first panel with a particular quantity of its mathematically correlated moduli group on the second panel, thereby to indicate simultaneously the range of moduli for each line coordinate in accordance with a particular calculation to be carried out.

As conducive to a clearer understanding of my invention, reference is made to FIG. 1 which depicts a portion of a standard frequency-reactance chart referred to hereinbefore partially broken away for purpose of analysis. The chart comprises a plurality of correlated reference line coordinates comprising an ordinate 1 representing reactance, an abscissa 2 for representing frequency, a first group of parallel lines 3 for representing inductance at an angle of 45° to abscissa 2 and a second group of parallel reference lines 4 for representing capacitance at right angles to the first group of parallel lines but at 45° to ordinate 1. It will be noted that the variables indicated are represented logarithmically such that the ordinate (reactance) is graduated into five logarithmic decades varying over the broad range of 10 ohms to 1 megohm, and the abscissa (frequency) into over three logarithmic decades covering a range from about 1 kc. to over 1000 kc. The two sets of 45 degree lines representing the other variables, each covering two decades of L or C for each decade of X and F, likewise cover a broad range of values.

Such a chart when used with a unit cell of the size shown in the cut away portion of the chart, to wit, the logarithmic decade illustrated by unit cell *abcd* is difficult to read. With my invention, I preferably employ one unit cell the size of the whole chart itself but with which I provide a novel means for indicating simultaneously the scale of each of the line coordinates to suit a particular problem. For example, if the frequency scale is to be read in the range of 1 kc. to 10 kc. in the one instance, by simply manipulating my device to indicate this frequency range and one other range from the data of the problem, I automatically obtain the ranges of the other two variables which are automatically and simultaneously set in position.

In a preferred form of my invention, besides limiting the ordinate and abscissa of the chart to one unit cell or logarithmic decade or other mathematical unit, I preferably modify the construction of the cell to simplify the use of the chart. In this connection, advantage is taken of the inherent geometry of the chart to separate the scales of the inductance cycles into top and bottom of the unit cell and those of the capacitance cycles into right and left. Two small rectangular sections or unit cells are found to exist, having their four corners on inductance-capacitance lines which are multiples of 10. These cells are illustrated in FIG. 1 as *efgh* and *ijkl*. These and other elements of the chart are described in the legend associated with FIG. 1.

I prefer, though my invention is not limited thereto, to use the cell designated as *efgh* in which there is a "regular" or "normal" reactance scale, its top and bottom being multiples of ten, with the center of the abscissa very near the 5 division on the logarithmic frequency scale. With this cell, the only offset decade is that for frequency. The other and less-preferred cell *ijkl* has its centers on the corners of the preferred cell and its corners in the centers of those cells.

I take my preferred cell, and produce my whole chart from it as shown in FIG. 2. This chart is associated with the surface of a first panel P–1 which is adapted to cooperate via windows 5, 6, 7 and 8 with a second panel P–2 shown in FIG. 3 and over which the first panel P–1 is superimposed in FIG. 2, said second panel having on the surface thereof a plurality of groups of moduli scale quantities or calibrations designated as 5′, 6′, 7′ and 8′ which are positioned so as to relate to their corresponding windows 5, 6, 7, and 8 on the first panel.

Referring first to FIG. 2, an enlarged unit cell is disclosed in the form of a chart based on the logarithmic scaling of the variables frequency, reactance, inductance and capacitance. To aid in using the chart, the line coordinate, corresponding to reactance normally appearing on the ordinate itself, is represented by reference line 9 spaced parallel to the ordinate as shown and graduated as a single logarithmic decade. Similarly, to further aid in using the chart, the line coordinate corresponding to frequency normally appearing upon the abscissa itself is shown represented by reference line 10 spaced parallel to the abscissa but graduated logarithmically so that the 5 calibration appears substantially in the middle of reference line 10 as mentioned hereinbefore.

The parallel reference line coordinates corresponding to capacitance spaced from the lower left to the upper right portion of the chart at 45° to the ordinate cover two decades as will be apparent from the intersection of these lines with the vertical left and right sides of the unit cell. These lines have been extended slightly off the unit cell so that they can be designated with their proper moduli values. Likewise, parallel reference line coordinates 12 corresponding to inductance spaced from the lower right portion to the upper left portion of the chart at right angles to the capacitance reference lines but at 45° to the abscissa are also provided spreading over two logarithmic decades as will be apparent from the intersection of these lines with the upper and lower horizontal lines of the unit cell. As will be noted, these lines are designated with their corresponding values of inductance.

Figure 3:
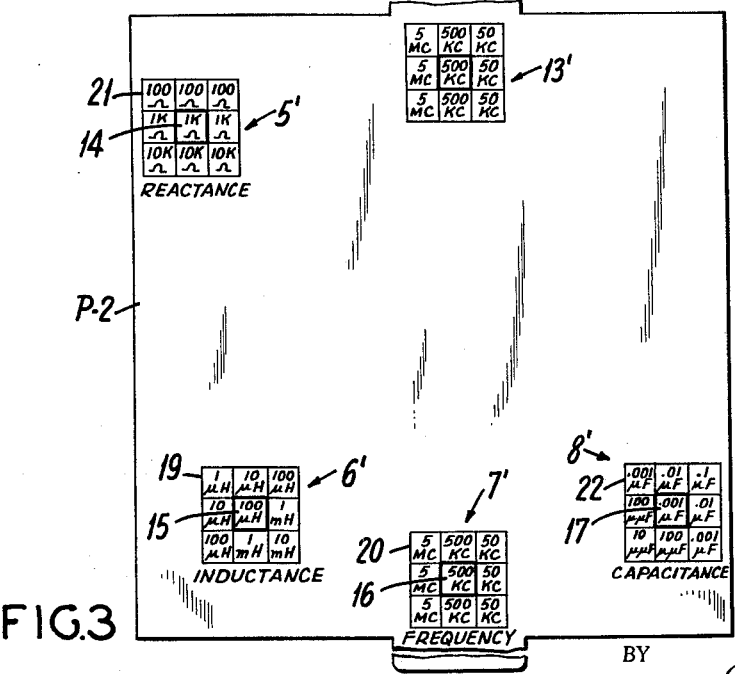
FIG. 3 is a detail top view of the lower panel of one embodiment of the device depicted in FIG. 2 showing how the moduli quantities corresponding to the variables frequency, reactance, inductance and capacitance on the top panel of FIG. 2 are positioned so that they are mathematically correlated with each other and to the line coordinates appearing on the top panel.

In determining the moduli ranges for each of the reference lines, the moduli groups on panel P–2 of FIG. 3 are arranged so as to be mathematically correlated to the corresponding variable on FIG. 2. Referring to moduli group 5′, it will be noted that the reactance quantities are arranged in unit squares, with the values constant horizontally as are shown on the chart on FIG. 2, the values ranging vertically from 100 ohms to 10 kilo ohms or three decades. In the case of moduli group 6′ representing inductance, the values are constant along 45° diagonals from lower left to upper right as they would appear on the chart. In this group, the range covered varies from one microhenry to as high as 10 millihenries, a total of five decades.

The frequency moduli group 7' shows the frequency values constant in vertical squares such as they would be read off the abscissa. The frequency range here varies from 50 kilocycles to 5 megacycles or a total of three decades. The group 8' representing capacitance shows the values constant along 45° diagonals from upper left to lower right as they would appear on the chart. These range from 10 micromicrofarads to 0.1 microfarad or a total of 5 decades.

I find that by arranging the moduli quantities in the mathematical groups shown, I can immediately determine the scale or range of each of the line coordinates on panel P-1 merely by superimposing panel P-1 over panel P-2 and matching the windows with the corresponding squares on P-2 by moving one panel multi-directionally relative to the other, for example up or down, or to the right, or left, or diagonally. This is because each of the groups on panel P-2 are mathematically correlated to each other. For example, referring to window 5 on FIG. 2, the value for reactance of 1 kiloohms is revealed. This is the value given in square 14 of group 5' on FIG. 3. This means the range for reactance on the reference line parallel to the ordinate varies from 0.1 kiloohms to 1 kiloohm.

In window 6 of FIG. 2, the value of 100 microhenries is revealed which is the value of square 15 of group 6' on the lower panel P-2 shown in FIG. 3. This means that along the bottom of the unit cell of FIG. 2, the inductance represented along the abscissa will range from 10 to 100 microhenries at the bottom and continue at the top at 18 from 100 microhenries to 1000 microhenries.

In window 7 of FIG. 2, a frequency value of 500 kilocycles is given which is the value shown in square 16 of group 7' in FIG. 3.

Likewise the value of 0.001 microfarad in window 8 is the value shown by square 17 of group 8' of FIG. 3.

In utilizing the two panels, it is preferred that means be employed for indexing the windows of panel P-1 with the desired values on panel P-2. This can be done by either mechanical means for obtaining parallel motion between the two panels or by visual indexing means. One indexing method is to provide frequency moduli group 13' which is exactly the same as that of group 7'. A window 13 is provided for it on panel P-1 which helps to locate accurately the top panel relative to the bottom one when both windows read the same. Other indexing means may be provided for lining up the panels such as mated markings on each of the panels which match up at each incremental displacement of the panels relative to each other.

Once the scales of the reference line coordinates of the large unit cell have been determined, the chart can then be used to solve a particular problem falling within the scale. For example, assuming a frequency of 400 kc. and an inductance of 80 microhenries, the other variables would be determined graphically as 0.002 microfarad for the tuning capacitance and 200 ohms for reactance (of either coil or condenser).

Assuming a problem in which the value for inductance is 0.8 $\mu$h. and the value for frequency is 4 megacycles, the remaining variables are easily calculated by first setting up the scales. The value for inductance indicates a scale of 1$\mu$h. and that for frequency a scale of 5 megacycles. By setting up the two panels so that square 19 of moduli group 6' appears in window 6 and square 20 of moduli group 7' appears in window 7, the other scales are immediately determined as 100 ohms for reactance (square 21 of group 5' appearing in window 5 and 0.001 $\mu$f. for capacitance (square 22 of group 8') appearing in window 8. Having determined the scales, the value for reactance is calculated as 20 ohms and for capacitance as 0.002 $\mu$f.

Figure 4:
FIG. 4 is illustrative of another embodiment of a lower panel showing the broad range of quantities that can be handled by a chart based on a one unit cell, including an additional moduli quantity for representing a reciprocal of reactance.

The utility of my device is at once apparent from the foregoing. The range over which the unit cell may be employed is theoretically unlimited although practically it will depend upon the number of unit rectangles making up each of the moduli groups on panel P-2. As shown in FIG. 3, each of the groups is composed of nine unit rectangles. However, my device need not be limited thereto. Another embodiment of the bottom panel is shown in FIG. 4 comprising moduli groups each of which contain 56 unit rectangles.

Moduli group 25 represents the values for reactance varying from 1 ohm to 1 megohm or total of 7 logarithmic decades. Moduli group 26 represents the values for inductances ranging from 100 $\mu\mu$h. (referred to as pH) up to 1 kh. or a total of 14 logarithmic decades. Moduli group 27 relates to frequency and ranges from 50 cycles to 500 megacycles or a total of 8 logarithmic decades. Moduli group 28 which represents the values for capacitance ranges from 0.001 $\mu\mu$f. to 0.01 f. for a total of 14 logarithmic decades. The group 27' is the same as group 27 and is used similarly as in FIG. 3 as a means for indexing the panels during use.

The moduli group referred to by the numeral 29 is similar to reactance group 25 but differs in that it is the reciprocal of reactance calibrated in micromhos. This is in susceptance or admittance units. Thus, for a reactance of 1 ohm, the reciprocal is 1 mho or $10^6$ micromhos neglecting circuit resistance. Likewise, for a reactance of 1 megohm the susceptance would be 1 (micromho) as will be apparent by comparing group 25 with 29.

While the invention has been described with specific reference to the four mathematically correlated variables frequency, reactance, inductance and capacitance, it will be appreciated it is not limited thereto. For example, my invention is applicable to three-variable equations of the general type $f(X)=F(y) \cdot \phi(Z)$. This type of equation lends itself logarithmically to graphical analysis, since the log of the equation gives us a straight line function of the type:

$$\log f(X) = \log F(y) + \log \phi(Z)$$

This is particularly useful in solving hyperbolic functions of the Ohm's law type, to wit: $E=IR$.

Figure 5:
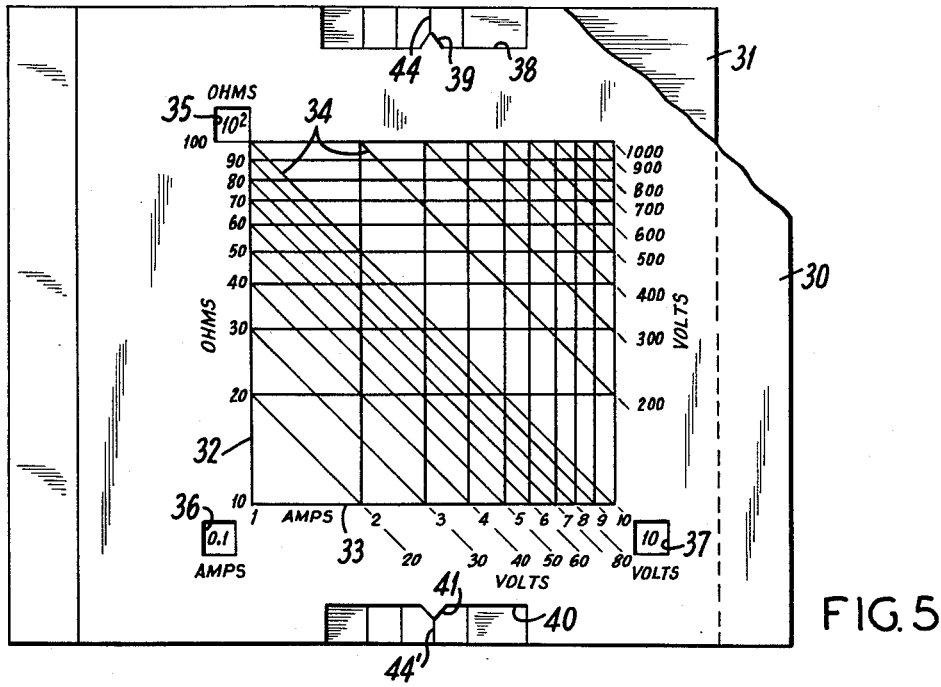
FIG. 5 depicts another embodiment of my device based on the three-variable system, E.M.F., current and resistance, as represented by the equation $E=IR$.
Figure 6:
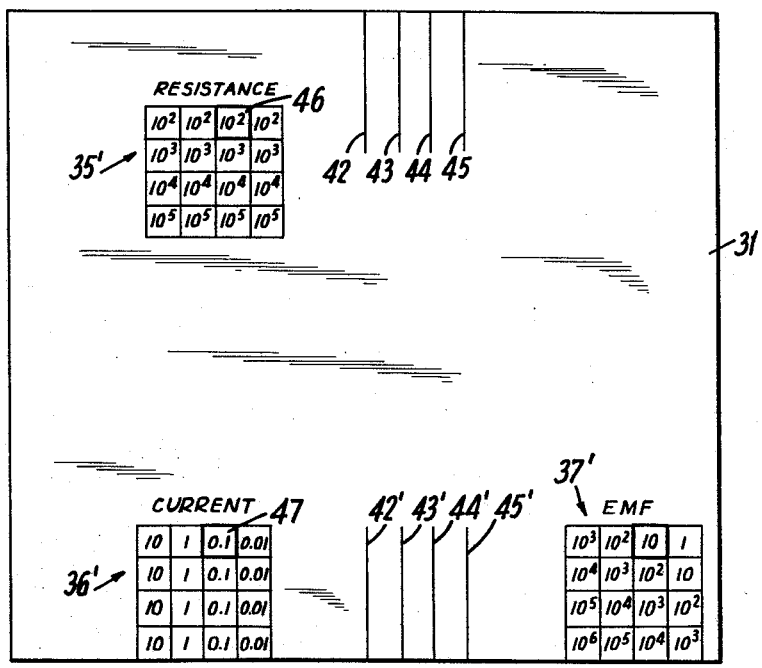
FIG. 6 shows the lower panel used with the top panel illustrated in FIG. 5.

FIGS. 5 and 6 are illustrative of another embodiment of my device as applied to the aforementioned equation $E=IR$. This device is similar to FIG. 2 except that only three variables are involved and also that the abscissa is a normal decade with log 5 in its normal position. The device comprises top panel 30 superimposed on bottom panel 31, said top panel having an enlarged unit cell thereon comprising ordinate 32 representing resistance in ohms and the abscissa 33 representing amperes. E.M.F. is represented by parallel reference line coordinates 34 which intersect the abscissa at a 45° angle, the parallel lines being spaced apart logarithmically similarly as in FIG. 2. These lines extend beyond the outline of the unit cell and are numbered with a value for volts, although these values will change depending on the units appearing in a problem. As in the frequency-reactance chart of FIG. 2, windows 35, 36, 37 are provided for indicating the scale for the reference lines, each window being correlated to a moduli group given as 35', 36' and 37' shown on the lower panel of FIG. 6. Indexing means for guiding the movement of the panels relative to each other are provided comprising a cut out 38 on the upper portion of the top panel having a pointer 39 and another cut out 40 and pointer 41 at the bottom portion. Pointer 39 is lined up with any one of the index lines 42 to 45 while pointer 41, which is at dead center below pointer 39, is lined up with one of the corresponding index lines 42', 43', 44' and 45'.

As shown in FIG. 5, the panels have been lined up to indicate a scale of $10^2$ ohms for resistance in window 35 (note rectangle 46 of group 35') and 0.1 ampere in window 36 (note rectangle 47 of group 36'), whereby the scale for E.M.F., 10 volts, automatically obtains in window 37.

It is apparent from the foregoing that the device is applicable to a variety of situations provided they can be identified with a mathematical type form which enables the mathematical correlation of the moduli groups on the bottom panel with the corresponding variables on the top panel.

Figure 7:
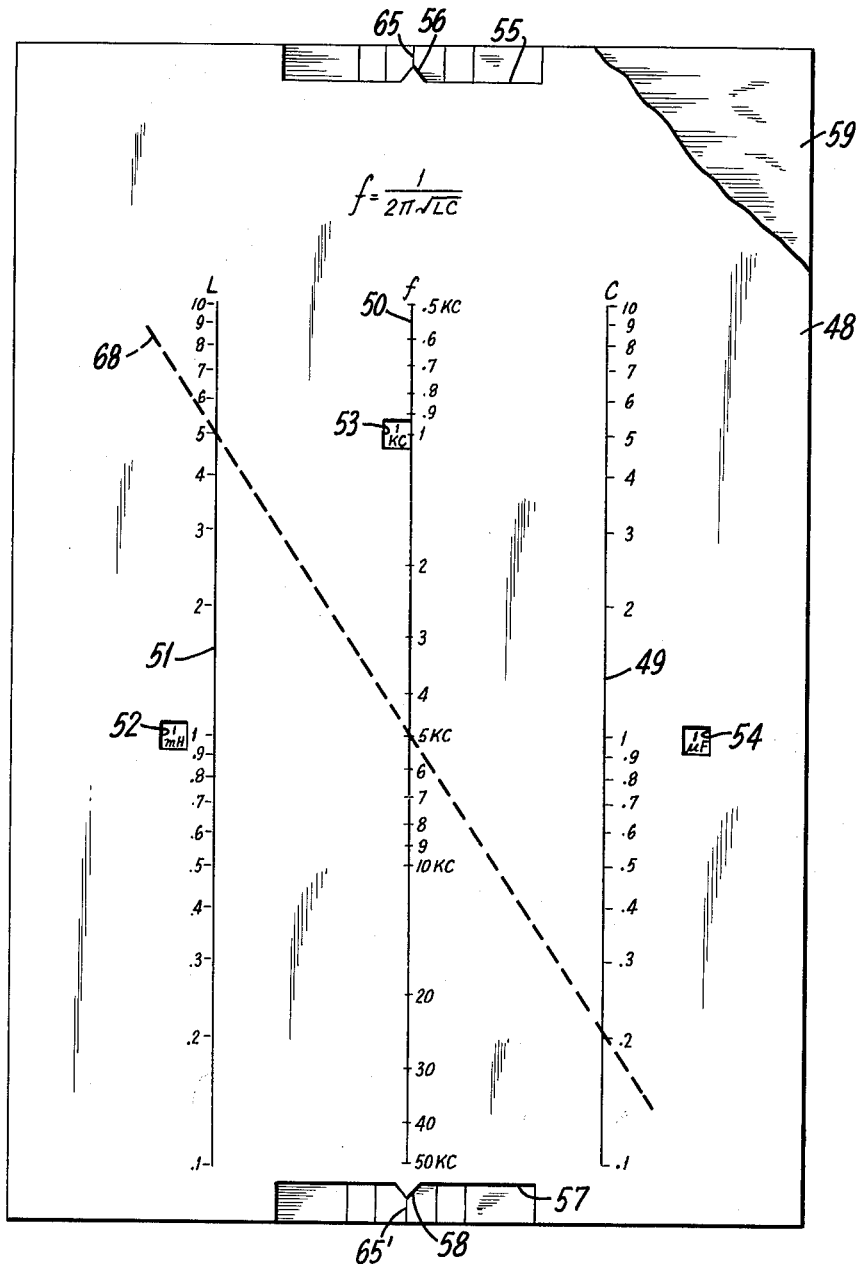
FIG. 7 depicts a nomograph of the alignment-chart type correlating inductance, frequency and capacitance.
Figure 8:
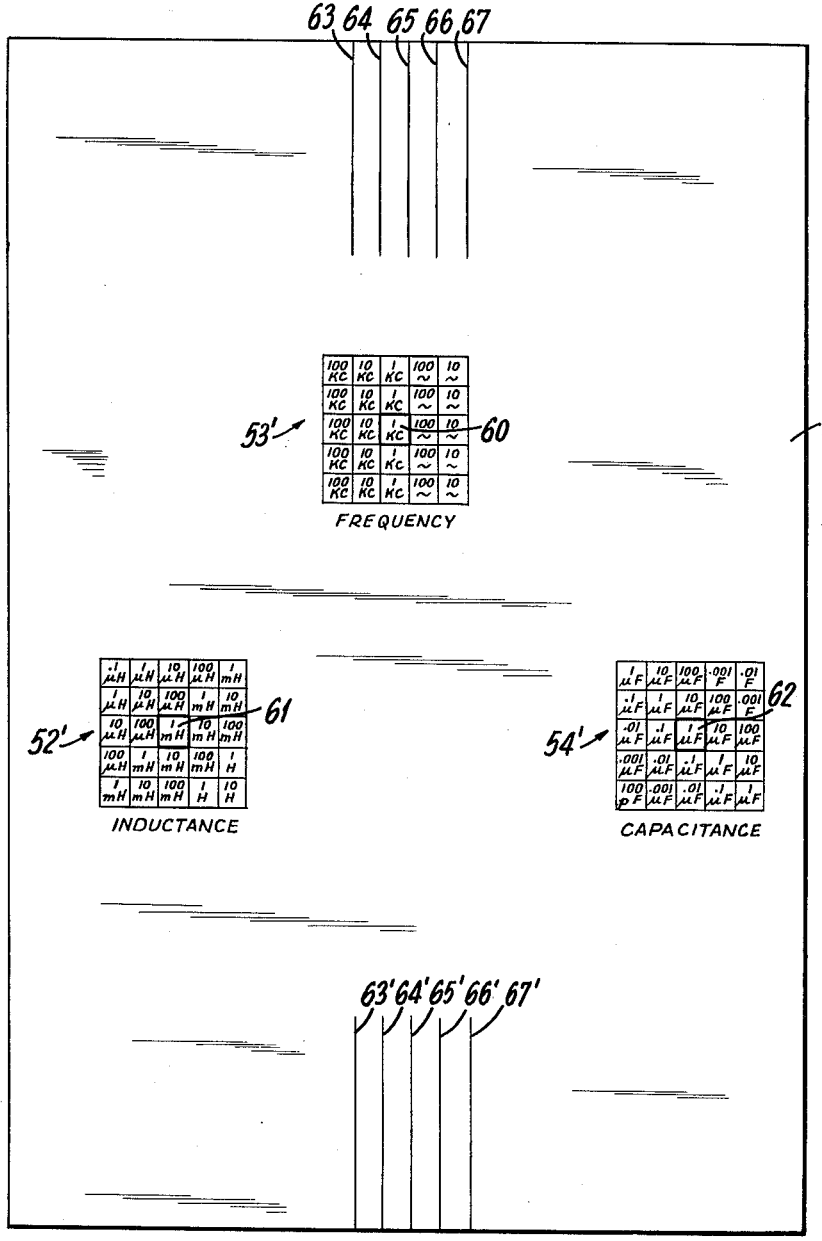
FIG. 8 shows the lower panel used with the top panel of FIG. 7.

Besides being applicable to nomographs of the cartesian-coordinate type illustrated by FIGS. 1 to 6, my invention is also applicable to those of the alignment-chart type as depicted by FIGS. 7 and 8. This chart is illustrative of a three variable system based on the equation:

$$f = \frac{1}{2\pi\sqrt{LC}}$$

for a coil and condenser in resonance, assuming negligible resistance in the circuit.

Referring to FIG. 7, I show an upper panel 48 superposed upon a lower panel 59 shown in more detail in FIG. 8. Three parallel line coordinates are shown, one for inductance (L) designated by the numeral 51, one for frequency ($f$) designated by the numeral 50, and the other for capacitance (C) designated by numeral 49. Reference line 51 at the left of the chart encompasses two logarithmic decades reading from the bottom to the top of the line. Reference line 49 at the right of the chart also encompasses two logarithmic decades reading from the bottom to the top of the line. Reference line 50 in the middle of the chart, while substantially the same length as the other two reference lines differs in the placement of the logarithmic units in that the "5" calibration appears substantially in the middle of the line and conforms substantially to reference line 10 of FIG. 2.

In addition to the foregoing, upper panel 48 is provided with windows 52, 53 and 54 for indicating the scale of its corresponding reference line, each window being correlated to a moduli group given as 52', 53' and 54' on lower panel 59 of FIG. 8. Indexing means for use in correctly setting one panel relative to the other are provided comprising a cut out 55 on the upper portion of the top panel having a pointer 56 and another cut out 57 and pointer 58 at the bottom portion. Pointer 56 is lined up with any one of the index lines 63 to 67 on panel 59 while pointer 58, which is at dead center below pointer 56, is lined up with one of the corresponding index lines 63' to 67'.

As shown in FIG. 7, the panels have been lined up to indicate a scale of 1 mh. for inductance in window 52 (note square 61 of group 52' in FIG. 8), and 1 kc. in window 53 for frequency in window 53 (note square 60 of group 53' in FIG. 8), whereby the scale for capacitance, 1 µf., automatically obtains in window 54 (note square 62 of group 54' in FIG. 8).

The location of the windows and the corresponding moduli groups is a matter of convenience. As I have shown in FIG. 7, the placement of window 52 at the midpoint of reference line 51 enables a working scale ranging at a window scale value of 1 mh. of from 0.1 mh. (bottom of line) to 10 mh. to the top of the line. If the value in the window happens to be 100 mh., then the working scale range would be from 10 mh. at the bottom of the line to 1000 mh. or 1h. at the top of the line. And similarly with the determining of the ranges of the other reference lines.

Once the scale ranges of the reference lines have been determined for a particular problem, the alignment chart can be used to solve the problem. The parallel reference lines are correlated such that, any straight line intersecting all three of the reference lines, will yield values fitting the equation upon which the alignment chart is based. For example, assuming values of 5 mh. and 5 kc., the dotted line 68 on FIG. 7 is drawn to pass through those two values and the value 0.2 µf. obtained where the dotted line intersects reference line 49.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

What is claimed is:

1. A nomographic device for use in carrying out calculations involving a plurality of variables, which comprises a first panel having associated with the surface thereof a plurality of mathematically correlated reference line coordinates each related to a variable and each having indicia associated therewith setting off a fixed scale, a second panel upon which said first panel is superimposed, said second panel having a plurality of groups of moduli scale quantities with the scale quantities in each group arranged in vertical and horizontal rows and mathematically related to a particular line coordinate on the first panel, and a plurality of windows on said first panel, each for revealing a scale quantity and each correlated in position to a particular line coordinate and its corresponding group of moduli scale quantities on said second panel, such that one panel can be moved multi-directionally with respect to the other panel in order to reveal a mathematically correlated scale calibration within each of said windows in said first panel.

2. The device of claim 1 wherein indexing means are provided in cooperable association with the device to aid in lining up the first panel relative to the second in determining the quantities to be revealed in the windows.

3. A nomographic device for use in carrying out calculations involving four mathematically correlated variables expressible logarithmically as straight line functions which comprises, a first panel having associated with the surface thereof a plurality of mathematically correlated reference line coordinates each related to a variable and each having indicia associated therewith setting off a fixed logarithmic scale, said reference lines comprising an ordinate for representing a first variable, an abscissa for representing a second variable, a first group of parallel reference lines representing a third variable within the area bounded by the ordinate and the abscissa, said first group of parallel reference lines forming an angle 45° with said abscissa, a second group of parallel reference lines representing a fourth variable also within the area bounded by said ordinate and abscissa at right angles to said first group of lines but forming an angle of 45° with said ordinate, the spaces between the lines in each group of parallel lines being such as to vary logarithmically according to the values they represent, a second panel upon which said first panel is superimposed, said second panel having a plurality of groups of moduli scale quantities with the scale quantities in each group arranged in vertical and horizontal rows and mathematically related to a particular line coordinate on the first panel, a plurality of windows on said first panel, each correlated in position to a particular line coordinate and its corresponding group of moduli scale quantities on said second panel, and indexing means associated with said device for lining up the windows of said first panel with a particular scale quantity on said second panel, such that one panel can be moved multi-directionally with respect to the other panel so as to reveal a mathematically correlated scale calibration within each of said windows in said first panel.

4. The device of claim 3 wherein the ordinate and the abscissa on the first panel are graduated logarithmically into substantially one decade each, and wherein the 5 on the logarithmic scale of the abscissa appears at about the midpoint.

5. The nomographic device of claim 4 wherein the four mathematically correlated variables are based on the equations $$X_c = \frac{1}{2\pi fc} \text{ and } X_L = 2\pi fL$$

6. The nomographic device of claim 5 wherein means are provided in cooperable association with the device to aid in lining up the first panel relative to the second in determining the scale quantities to be revealed in the windows.

7. A nomographic device for use in carrying out calculations involving three mathematically correlated variables expressible in logarithmic units directly readable into their corresponding numbers which comprises, a first panel having associated with the surface thereof three mathematically correlated reference line coordinates arranged in parallel relationship to each other, each related to a variable and having indicia setting off a fixed scale of logarithmically varying moduli quantities corresponding to each of said variables, the mathematical correlation as between the reference lines being such that a straight line caused to intersect the three parallel reference lines yields at the points of intersection mathematically correlated values of the variables, a second panel upon which said first panel is superimposed, said second panel having a plurality of groups of moduli scale quantities, with the scale quantities in each group arranged in vertical and horizontal rows and each mathematically related to a particular line coordinate on the first panel, and a plurality of windows on said first panel, each correlated in position to a particular line coordinate and its corresponding group of moduli scale quantities on said second panel, such that one panel can be moved multi-directionally with respect to the other panel so as to reveal a desired scale calibration within each of said windows in said first panel.

8. The device of claim 7 wherein the three mathematically correlated variables are based on the equation $$f=\frac{1}{2\pi\sqrt{LC}}$$

such that on the first panel one of the parallel reference lines relates to frequency, a second of the parallel reference lines relates to inductance and the third of the parallel reference lines relates to capacitance and wherein each moduli group on the second panel is correlated to its corresponding reference line.

References Cited in the file of this patent

UNITED STATES PATENTS 1,087,445    Herrick _____ Feb. 17, 1914

OTHER REFERENCES

"Graphical Methods of Calculation" by Herbert L. Seward, Mechanical Engineering, November 1925, vol. 47, No. 11a, pp. 1019–1032.